United States Patent
Higgins et al.

(10) Patent No.: US 8,959,100 B2
(45) Date of Patent: Feb. 17, 2015

(54) SYSTEM AND METHOD FOR CONTEXT ENHANCED MAPPING

(71) Applicant: Yahoo! Inc., Sunnyvale, CA (US)

(72) Inventors: Christopher William Higgins, Portland, OR (US); Marc Eliot Davis, San Francisco, CA (US); Ronald Martinez, San Francisco, CA (US); Joseph James O'Sullivan, Sunnyvale, CA (US); Christopher T. Paretti, San Francisco, CA (US); Chris Kalaboukis, Los Gatos, CA (US); Athellina Athsani, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 14/076,948

(22) Filed: Nov. 11, 2013

(65) Prior Publication Data

US 2014/0067844 A1     Mar. 6, 2014

Related U.S. Application Data

(63) Continuation of application No. 12/182,813, filed on Jul. 30, 2008, now Pat. No. 8,583,668.

(51) Int. Cl.
| | |
|---|---|
| *G06F 17/30* | (2006.01) |
| *G06F 7/00* | (2006.01) |
| *G06Q 30/02* | (2012.01) |
| *G09B 29/00* | (2006.01) |
| *G09B 29/10* | (2006.01) |

(52) U.S. Cl.
CPC .... *G06F 17/30386* (2013.01); *G06F 17/30241* (2013.01); *G06Q 30/02* (2013.01); *G09B 29/007* (2013.01); *G09B 29/10* (2013.01)
USPC .......................................... 707/758; 707/755

(58) Field of Classification Search
USPC .................................. 707/758, 755
See application file for complete search history.

(56) References Cited

U.S. PATENT DOCUMENTS

| | | | |
|---|---|---|---|
| 2002/0039108 A1* | 4/2002 | Roy et al. ....................... | 345/619 |
| 2003/0059091 A1* | 3/2003 | Kambe et al. ................. | 382/113 |
| 2003/0080992 A1* | 5/2003 | Haines ........................... | 345/734 |
| 2008/0086356 A1* | 4/2008 | Glassman et al. .............. | 705/10 |
| 2009/0005987 A1* | 1/2009 | Vengroff et al. .............. | 701/300 |
| 2009/0177603 A1* | 7/2009 | Honisch .......................... | 706/45 |
| 2010/0118025 A1* | 5/2010 | Smith et al. .................... | 345/418 |

\* cited by examiner

*Primary Examiner* — Kuen Lu

(74) *Attorney, Agent, or Firm* — James J. DeCarlo; Greenberg Traurig, LLP

(57) ABSTRACT

A system and method for Context Enhanced Mapping. A request is received from a user over a network for a map comprising an identification of a physical location, and at least one criteria. The physical location is mapped. Spatial, temporal, topical, and social data available to the network relating to the physical location and criteria is retrieved using a global index of data available to the network and prioritized for inclusion based upon the user and context of the request. The map of the physical location and at least some of the retrieved spatial, temporal, topical, and social data is displayed on a display medium.

18 Claims, 17 Drawing Sheets

SYSTEM AND METHOD FOR CONTEXT ENHANCED MAPPING

CROSS REFERENCE TO RELATED APPLICATIONS

This application is a continuation of, and claims priority from co-pending U.S. patent application Ser. No. 12/182,813, filed on Jul. 30, 2008, entitled SYSTEM AND METHOD FOR CONTEXT ENHANCED MAPPING, which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for displaying a map on a network and, more particularly, to systems and methods for displaying maps which are enhanced using, in part, data collected and stored by multiple devices on a network.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is directed to a method. A request is received from a user over a network a request for a map comprising an identification of a physical location, and at least one criteria. The physical location is mapped. Spatial, temporal, topical, and social data available to the network relating to the physical location and criteria is retrieved using a global index of data available to the network. The map of the physical location and at least some of the retrieved spatial, temporal, topical, and social data is displayed on a display medium.

In another embodiment, the invention is directed to a system comprising: a mapping request module that receives, over a network, requests for a maps from users, wherein each request comprises an identification of a physical location, and at least one criteria; a map generation module that maps the physical location; an enhanced content search module that retrieves spatial, temporal, topical, and social data available to the network relating to the physical location and the criteria of each request using a global index of data available to the network; a context enhanced display module that displays, on display media, maps of physical location mapped by the map generation module and at least some of the retrieved spatial, temporal, topical, and social data retrieved by the enhanced content search module.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
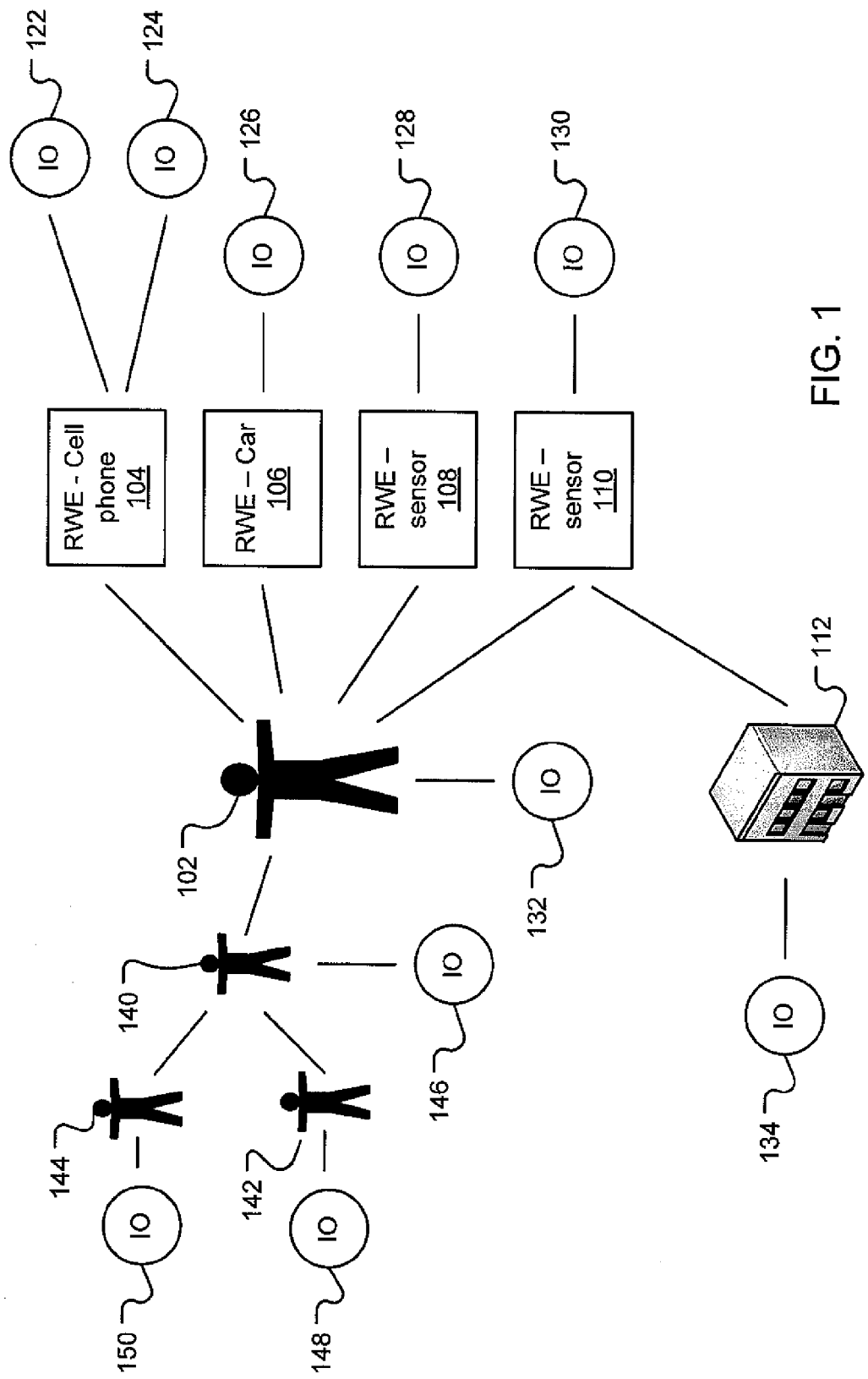
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWE's on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
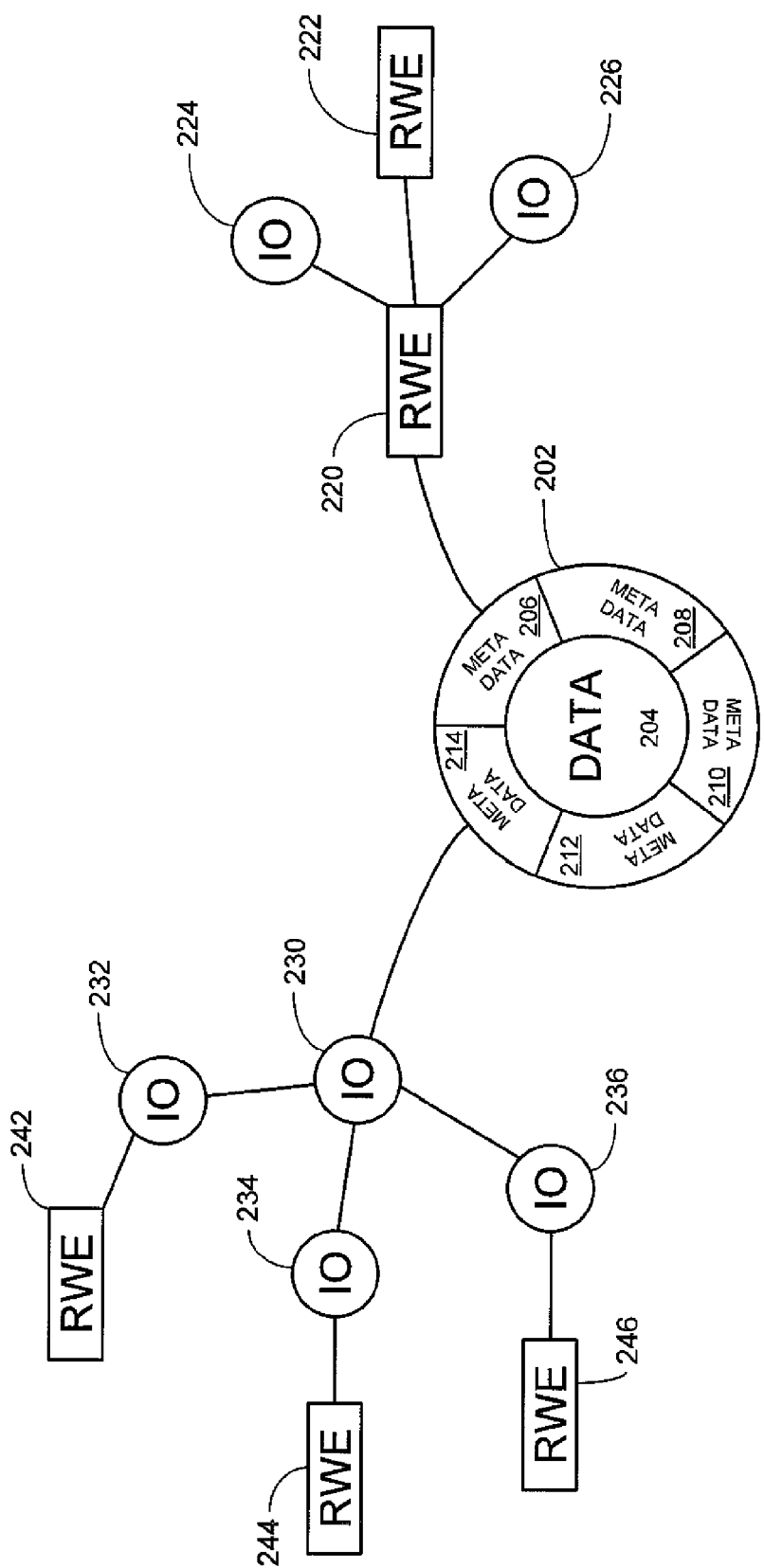
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
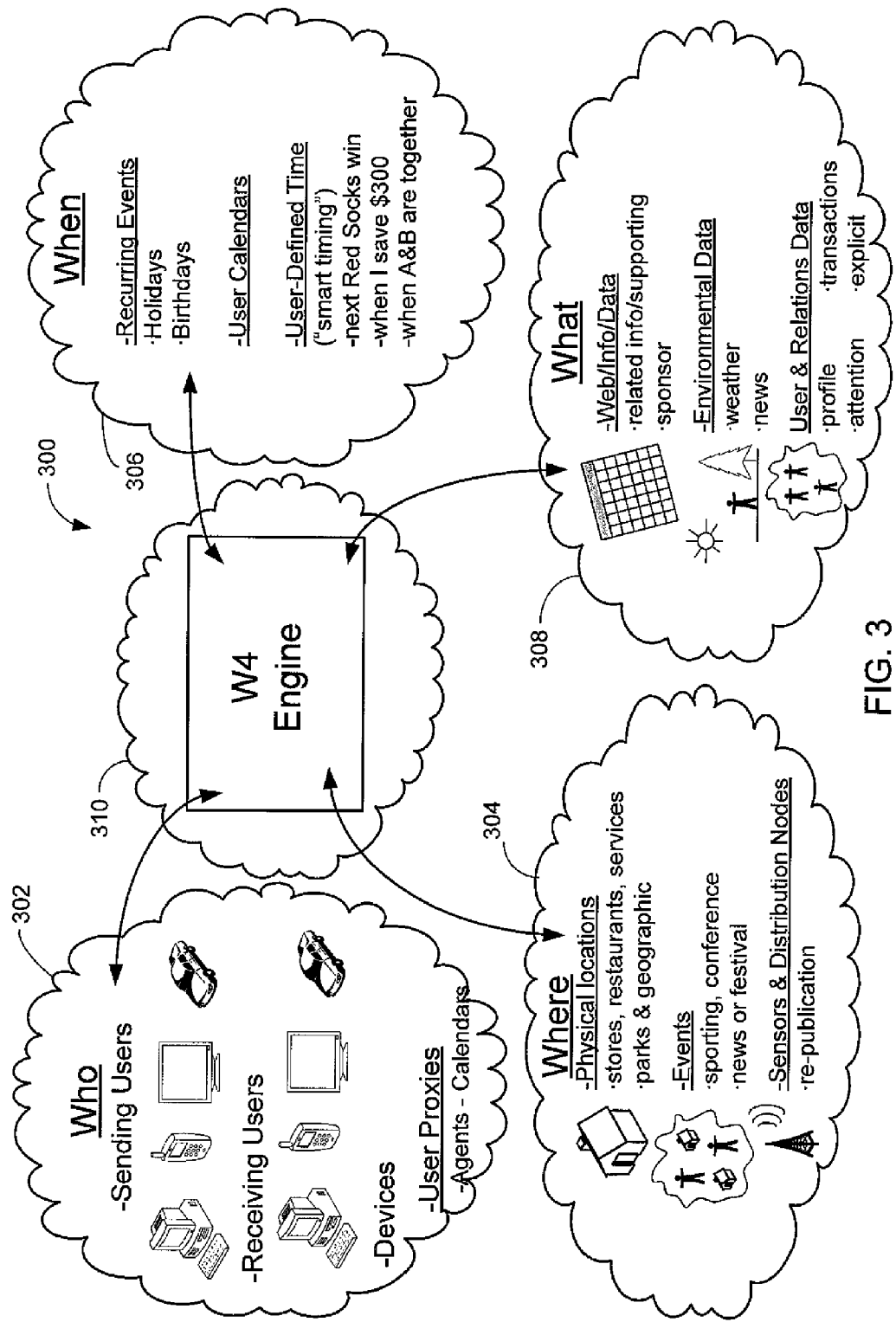
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a genrel-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
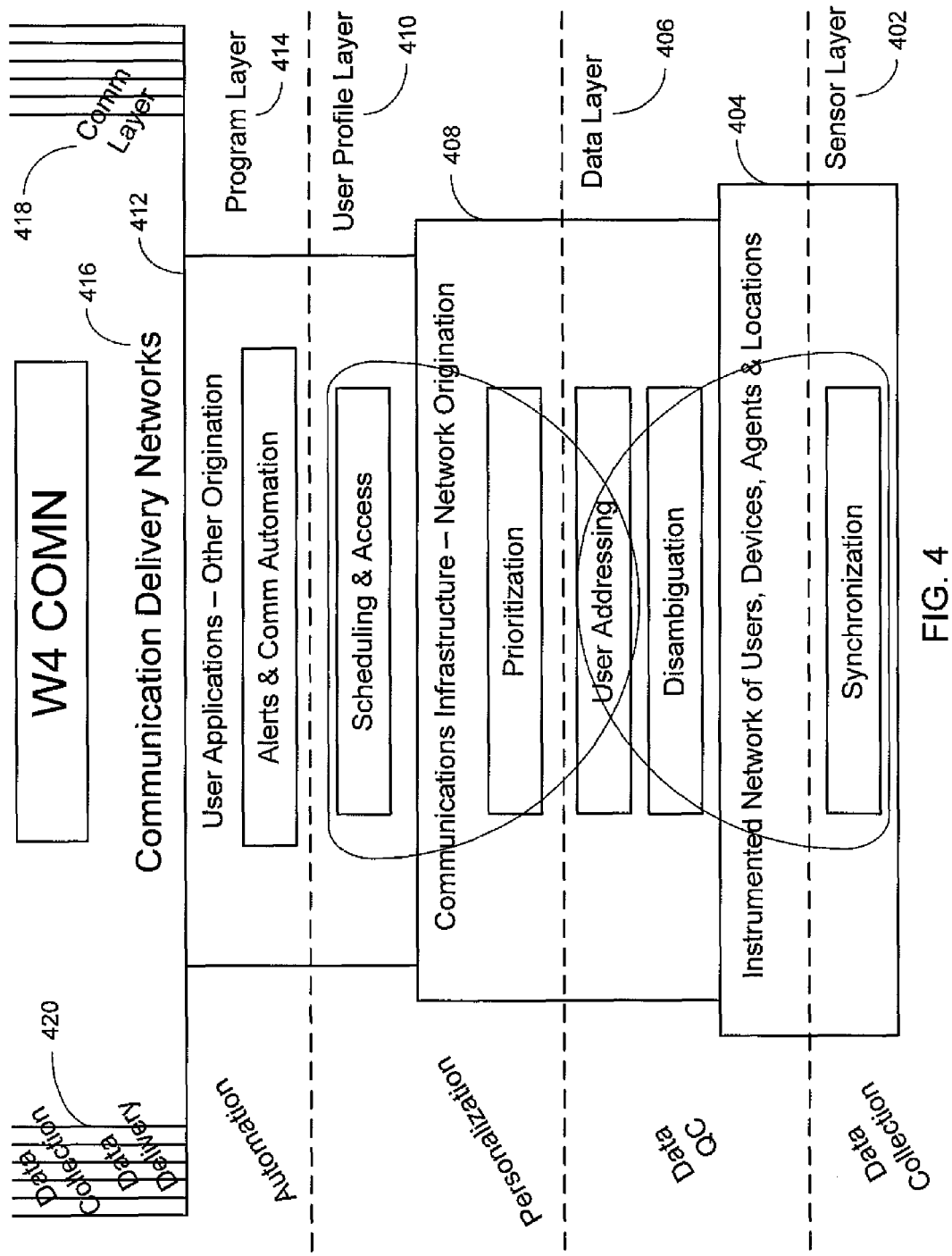
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photoblogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
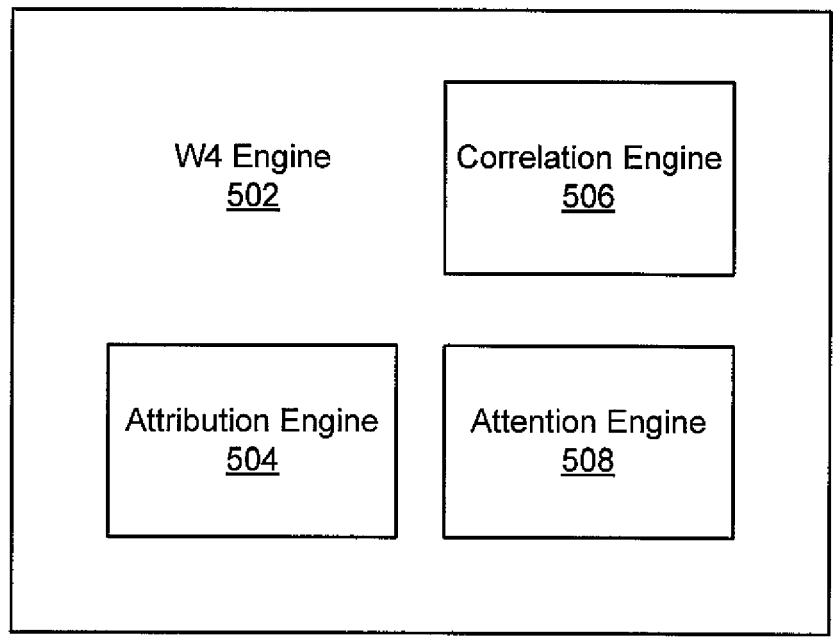
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
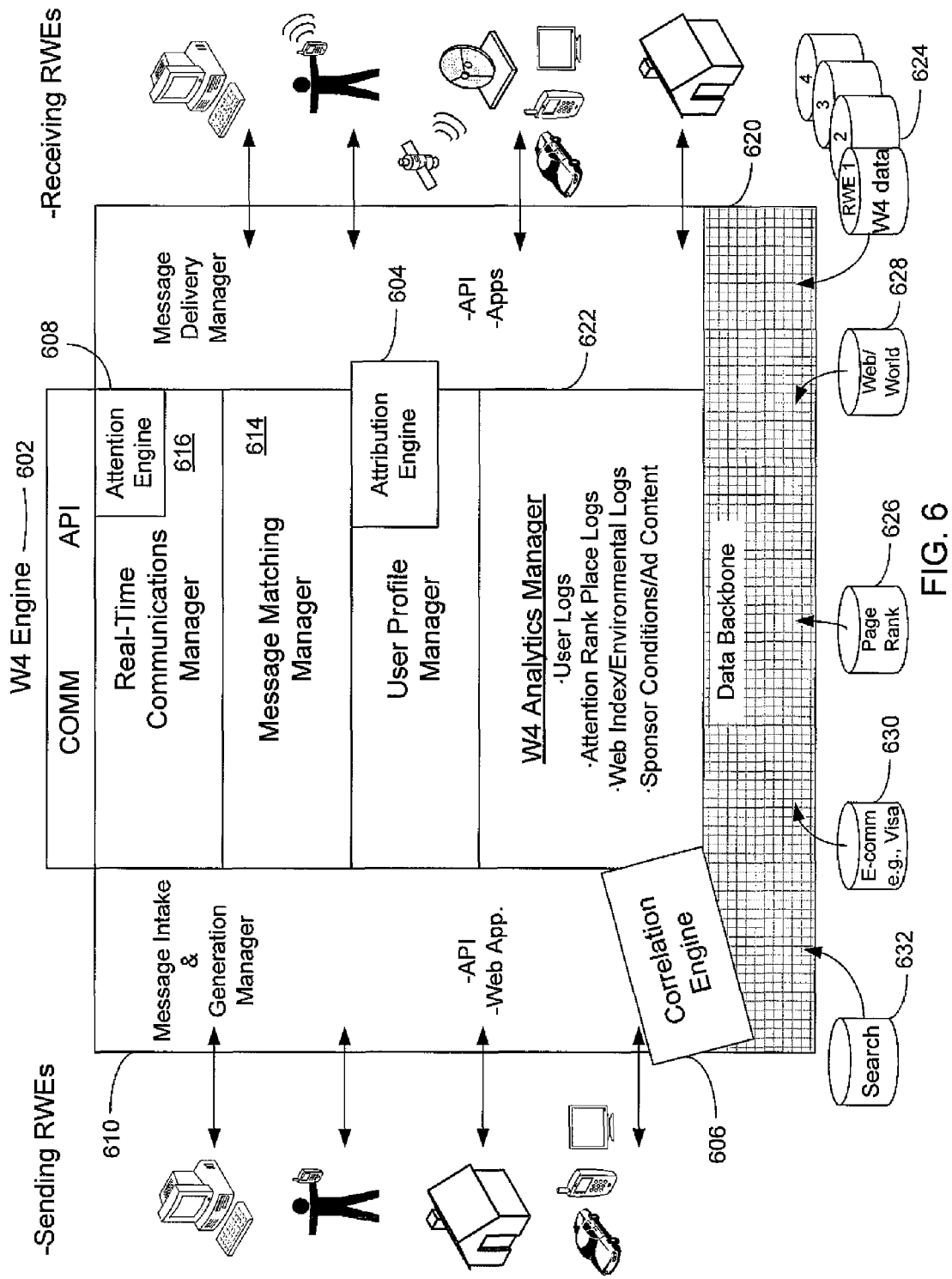
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Context Enhanced Mapping

Online mapping and routing, for example, Yahoo Maps, has been available via the Internet for many years. Users can display maps at varying levels of detail, can plot routes between points, and display a range of content, such as, for example hotels or businesses of a specific type. A person may wish, however, to capture a more complex set of real-time, rich information overlaid on their map, for example, a person may wish to create a map for a specific purpose, location or locations and target audience. For example, a user may wish to display a map enhanced with content for a 14 year-old girl who has soccer for a hobby who is having an all-girl birthday party in the city. In another example, a user may wish to display a map enhanced with content for a visiting physics professor from Japan who is in his 50s who likes jazz and physics. In yet another example, a person may wish to display a map showing points of interest for a punk rock band visiting Los Angeles for the first time.

More abstractly, when a user is requesting a map or a route, the user may be said to have a specific context in mind. In one embodiment, the user's context can be defined as a set of criteria that describe or circumscribe one or more related ideas central to that user in that context, and which can thus be used to create a model of the map needs for that instance. The criteria can be conceptually divided into four categories: Who, What, When and Where.

"Who" criteria are persons, devices, or proxies who are related to the ideas embodied in the context. "Who" may be a known person, such as the user or a specific person known by the user. "Who" may also be a list of specific persons, such as the contact list stored on the PDA of a user, or persons listed on a user's social network profile as friends. Alternatively, "Who" can be a general description of persons of interest, such as persons who are interested in surfing, single women in their 40's who drive motorcycles and like yoga, men who like football and commute by bus, persons who pass by a billboard more than three times a week and/or customers of a specific restaurant who also drive BMWs.

"What" criteria are objects or topics, concrete or abstract that relate to the ideas embodied in the context. "What" may be the form of media the user is interested in, such as photos, music or videos. "What" may be a genre of music or video, such as country or rock. "What" may be subject matter addressed in media, such as love songs or even specific lyrical phrases. Alternatively, "What" may be a mood or atmosphere, such as happy, sad, energetic, or relaxed. As an indicator of topical relevance, "What" criteria are an unbounded set of things determined by human creation, attention and association or tagging.

"When" criteria are temporal constructs such as dates and times which are related to the ideas embodied in the context. "When" may be the current date and time. "When" may also be a specific date and time in the past or the future, or a range of dates and times in the past or the future, such as a duration, e.g. two hours, four weeks, one year. "When" may be a conditional occurrence if specified conditions or criteria are met. "When" may be an offset from a specific date, for example, ten days in the past, or an offset from a conditional occurrence, ten days after a mortgage payment is late. Alternatively, "When" can be an event on a calendar, such as a birthday, a season or a holiday, or an event of personal or societal/social importance, such as the last time a favorite sports team won a championship.

"Where" criteria are physical locations. "Where" may be a user's current location. "Where" may be specific places, such as a country, a state, a city, a neighborhood. "Where" may be defined as the location of an event, such as a concert or some other newsworthy occurrence, or alternatively the personal location of a user when they learned of an event, e.g. where were you when you heard about 9/11. Alternatively, "Where" can be a general description of places of interest, such as blues or jazz clubs, or a conditional location depending on the satisfaction or resolution of specified criteria. For example, "where" can be the real-time most popular club for 24-35 year olds, or "where" can be the research lab where breast cancer is finally cured.

The embodiments of the present invention discussed below illustrate application of the present invention within a W4 COMN. Nevertheless, it is understood that the invention can be implemented using any networked system, virtual or real, integrated or distributed through multiple parties, that is capable of collecting, storing accessing and/or processing user profile data, as well as temporal, spatial, topical and social data relating to users and their devices. Thus, the term W4 COMN is used herein for convenience to describe a system and/or network having the features, functions and/or components described herein throughout.

A W4 COMN can provide a platform that clusters map features and content around known W4 RWEs or IO types. Such data clustering can provide a highly personalized, automated mapping and display centered around a specific user or set of users and their associated devices, data sources and associations with other RWEs or IOs using the profile created from the aggregated W4COMN data collected whether on or off-network, from third-parties, carriers, partners, and so forth.

Figure 7:
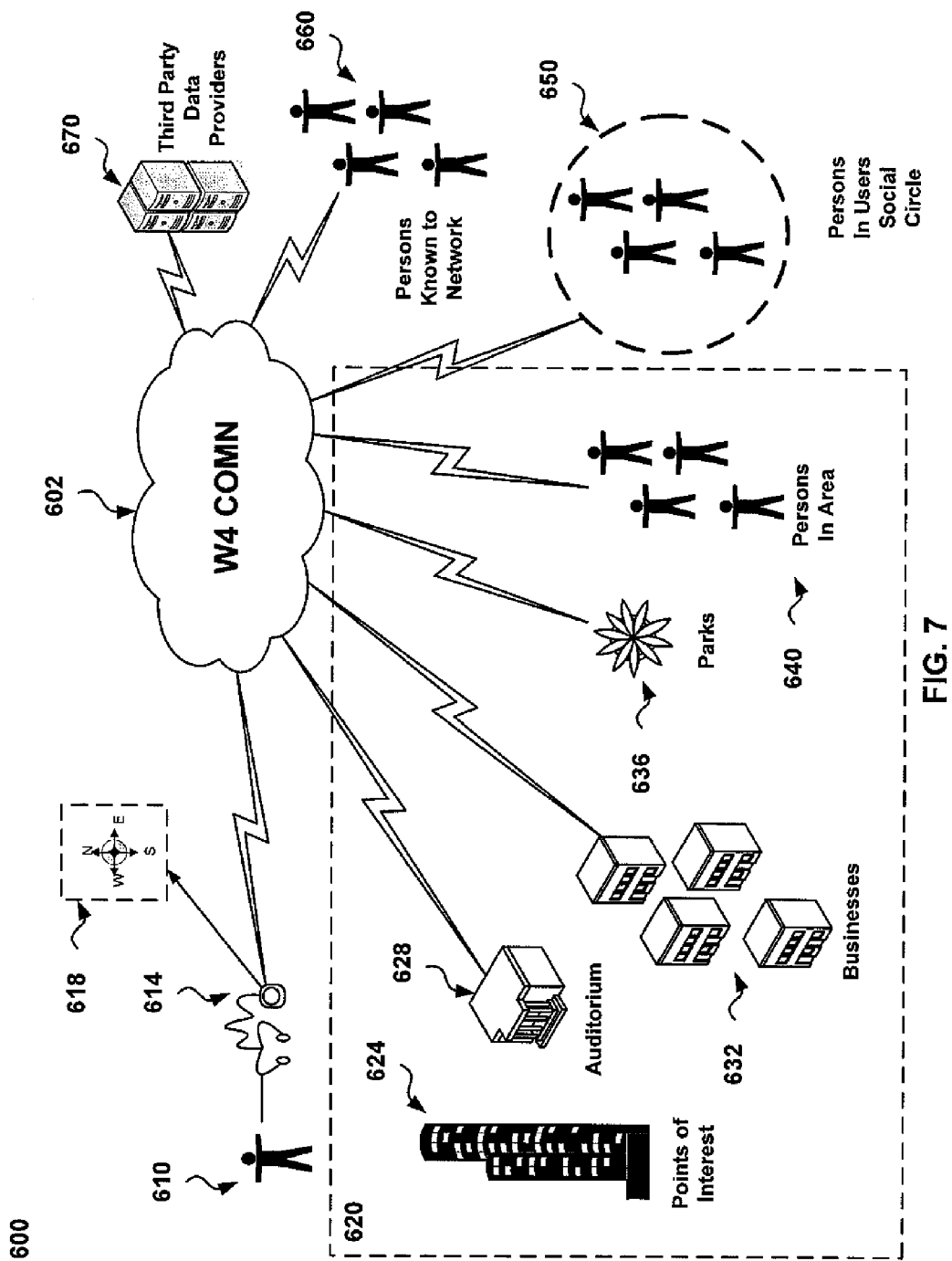
FIG. 7 is a high level diagram of a system that can provide enhanced content for a map or route request.

FIG. 7 is a high level diagram 600 of a system that can provide enhanced content for a map or route request. A user 610 can submit a request to network 602, for example, a W4 COMN, to display a map 618 on the user's proxy device 614. In the illustrated embodiment, the bounds of the requested map encompass a geographical area 620. Within the geographical area 620 are a large array of entities known to the network 602. Such entities include tourist attractions and other points of interest 624, auditoriums and other public venues 628, businesses of various types 632, parks and recreation areas 636, and persons 640. The network collects spatial, temporal, social, and topical data, including behavioral and interaction data about these entities that can be used to enhance information displayed on maps of the area.

Outside of the geographical area 620 of the map request are a large, and potentially unbounded set of entities known to the network 602. These entities can include the persons within user's social networks 650, other persons known to the network 660 (i.e. not known to the user and not in the geographical area), and third party data sources 670 which can include free and premium information services which provide data about other entities and topics including routes labeled for a specific purpose, reviews, ratings or rankings of locations by users and multimedia content associated with locations, events objects or people. The network collects spatial, temporal, social, and topical data, including behavioral and interaction data about these entities as well. This data may relate to entities within the geographical area and can additionally used to enhance information displayed on maps of the area.

Figure 8:
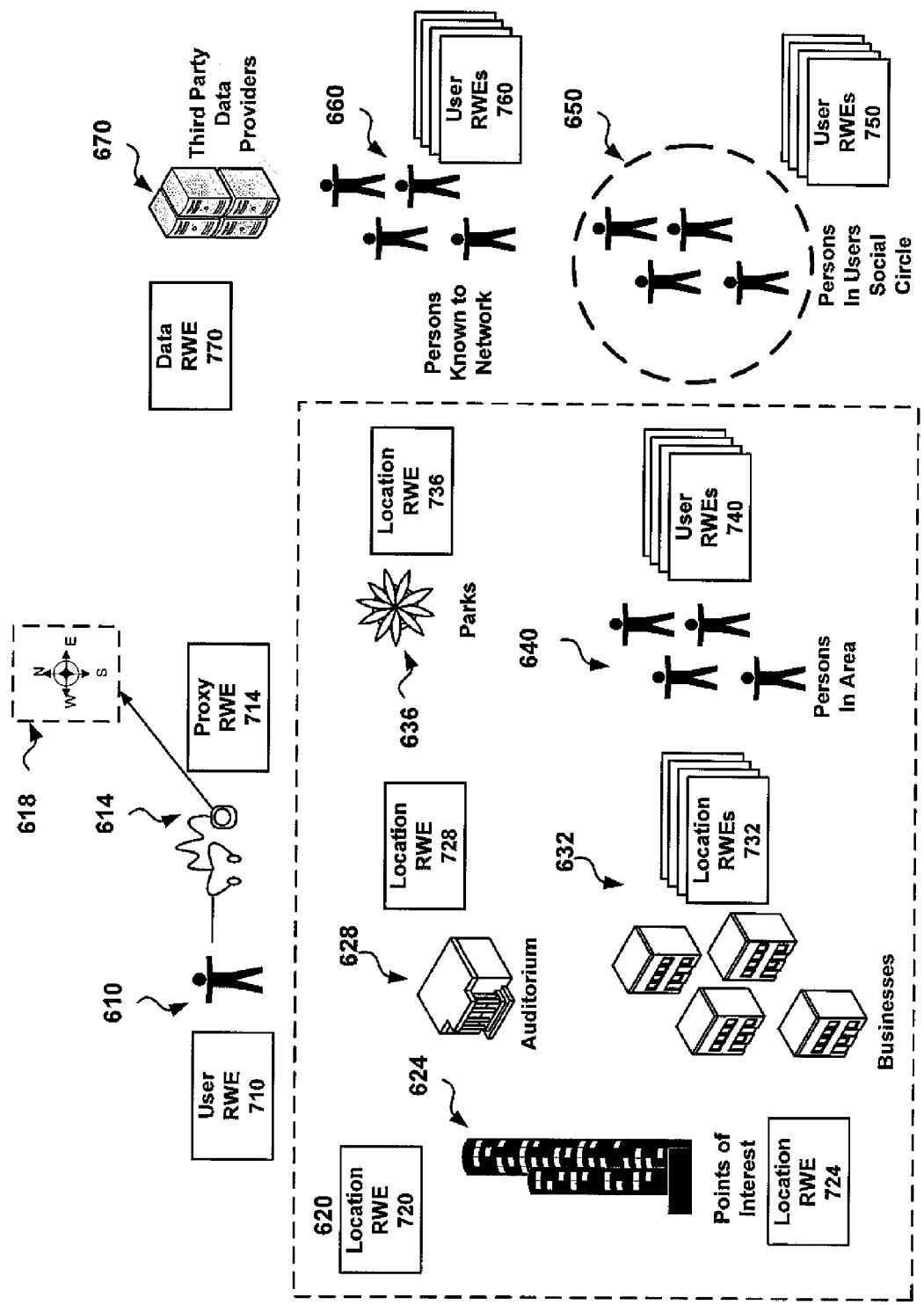
FIG. 8 illustrates how the entities displayed in FIG. 7 may be defined to a network, for example a W4 COMN.

FIG. 8 illustrates how the entities displayed in FIG. 7 may be defined to a network, for example a W4 COMN. User 610, 640, 650 and 660 are represented by user RWEs 710, 740, 750 and 760 respectively. User 610's proxy device 612 is represented as a proxy RWE 712. The area represented by the map 620 may be a distinct geographical entity such as a city, and can itself be represented as a location RWE 720. Locations 622, 624, 626, 628, and 630 are represented as location RWEs 722, 724, 726, 728, and 730 respectively. A third party data provider is represented as data server RWE 760.

Figure 9:
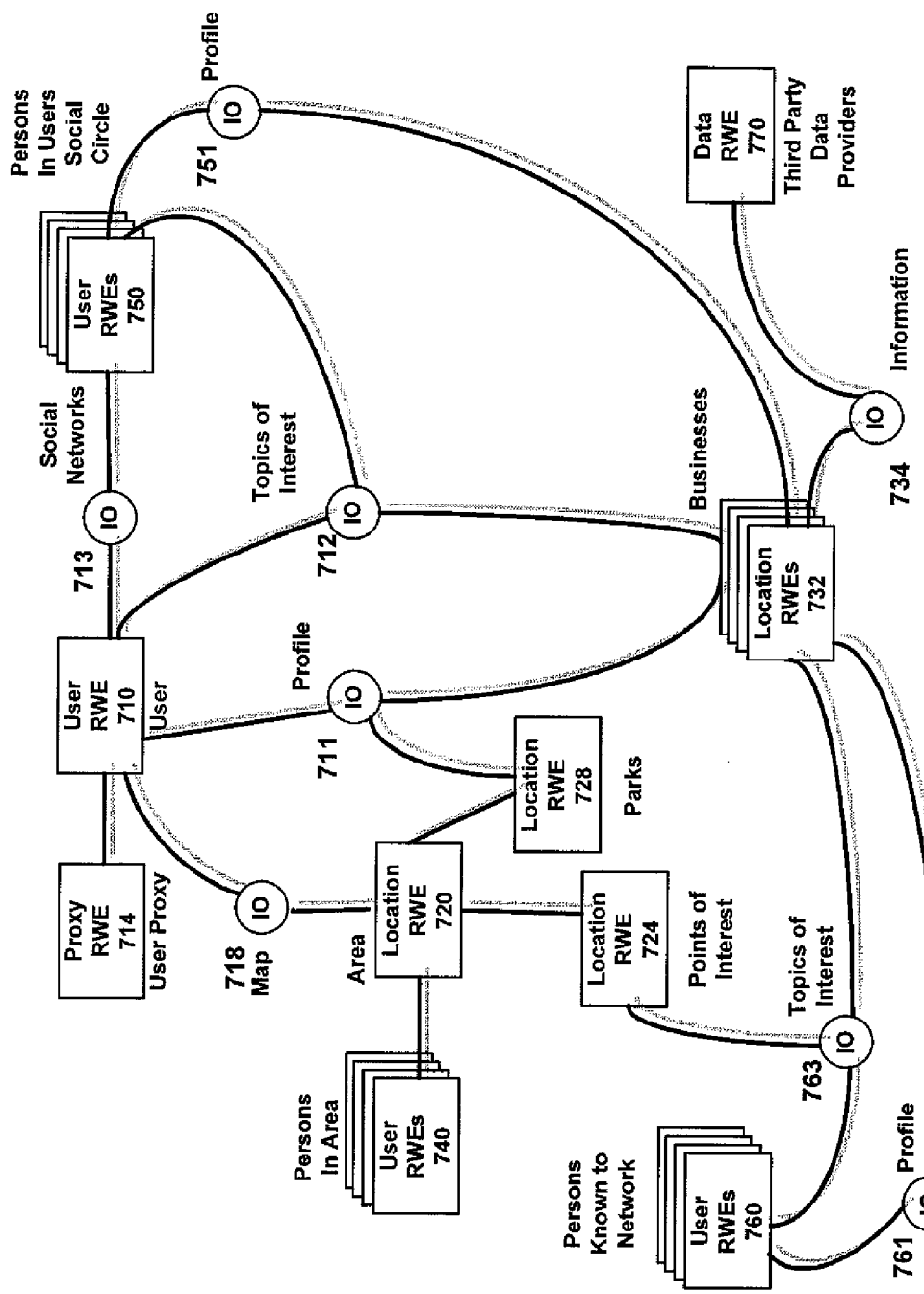
FIG. 9 illustrates one embodiment of a data model which shows how the RWEs shown in FIG. 8 can be related to one another directly and indirectly though intermediate IOs.

FIG. 9 illustrates one embodiment of a data model which shows how the RWEs shown in FIG. 8 can be related to one another directly and indirectly though intermediate IOs. The relationships illustrated are intended to be illustrative, and do not represent the full range of interrelations among data supported by a W4 COMN.

A user 710 requesting a map can be related, directly or indirectly to one or more RWEs associated with spatial, temporal, social, and topical data that relate to the area encompassed by a map request, and which can be used to provide enhanced content on the map display. The user 710 can be related through a profile IO 711 to, for example, one or more location RWEs, which may encompass parks 728 or businesses locations 732 frequented by the user or which the user has explicitly designated as a personal favorite. The user 710 can also be related through topical IO 712 to, for example, one or more business locations RWEs 732, which engage in a line of business of interest to the end user. For example, if the requesting user likes Jazz music, the topical 10 could be night clubs featuring Jazz.

The user 710 can additionally be related to a group of users 750 through a social network 713. Each of users 750 may relate directly or indirectly to one or more RWEs associated with spatial, temporal, social, and topical data that relate to the area encompassed by a map request. For example, profile data 751 for one or more of the users 751 can indicate that one or more business locations 732 are frequented by or favorably reviewed by such users. The users 751 may also can also be related through one or more topical IOs 712 to, for example, one or more business locations RWEs 732, which engage in a line of business of interest to the user. For example, such a topical 10 could relate to a type of food, such as sushi, favored by the end user.

The user 710 is also associated with a map request 718. Through the map request 718 the user 710 can also be considered to be logically related to a geographical area RWE 720 which can be related to RWEs of interest within the area such as points of interest 724 (i.e. tourist locations) and parks 728.

Context enhanced content can also be obtained from the perspective of users known to the network 760 who are not related to the end user. Each of users 760 may relate directly or indirectly to one or more RWEs associated with spatial, temporal, social, and topical data that relate to the area encompassed by a map request. For example, the users 760 can also be related through a topical IO 763 to, for example, one or more business locations RWEs 732, which engage in a line of business of interest to the user. For example, such a topical IO could relate to a type of activity favored by the user, such as tennis.

Any entity, for example the business locations 732, can be associated with a variety of additional information 734. Such additional information may provide, for example, descriptions of a business, basic commercial information about a business such as hours of operation or products offered, commercial incentives, reviews, ratings or rankings of the business relative to other local businesses. Such information can be sourced from third party data providers 770. Such third party providers may be, for example, Internet search engines, public or semi-public user groups, social networking site providers or premium content providers, such as a paid site having restaurant reviews (e.g. Zagats.)

In one embodiment, all of the relationships shown in FIG. 9 are maintained by processes existing within the network. Using social, spatial, temporal and logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, the W4 COMN builds a profile of a user over time by collecting data from the user or from information sources available to the network so as to gain an understanding of where they were born, where they have lived, and where they live today. Using social data, the W4 COMN can also create an overlapping social network profile which places the user in a temporal, geographic and social graph, thus determining where a user lived when and with whom. User RWEs can be also be associated with other RWEs through interaction data. Users who are interested in the same time/place can declare their interests and be connected to a topic based social network through, for example, an IO relating to a topic.

Data and data relationships such as those shown can be used to add enhanced content to a map displayed by a context enhanced mapping system. In the simplest case, a user can enter a request for a map with no additional parameters and the system can retrieve enhanced content for entities within the geographical scope of the mapping request at the specific time and place of the request.

For example, in FIG. 9, the user 710 has a profile IO 711 that associates the user with parks 728 and businesses 732 within the scope of the mapping request that, for example, past behavior indicates the user has visited. The user 710 is also associated with topical IOs 712 that associate the user with businesses 732 within the scope of the mapping request that, for example, indicate the businesses relate to one or more interests of the user. The user is also associated with one or more social networks 714 that associate the user with one or more users 750. The users 750 can have profile data 751 and topical interest 712 that associate those users with entities within the scope of the mapping request.

A context enhanced mapping request can additionally include parameters that explicitly modify the request with temporal, social, or topical criteria. Temporal criteria can be used to select enhanced content for entities having properties that vary over time. For example, a context enhanced mapping request could include criteria to select retail businesses that are open until 9:00 PM. Such information can be available to the network through information 734 associated with commercial locations within the scope of the mapping request.

Social criteria can be used to select enhanced content for entities that relate to one or more persons. For example, context enhanced mapping request could include criteria to select businesses that are patronized by ones which include as customers persons within one's social circle 713. Such information can be available to the network through information 734 associated with commercial locations within the scope of the mapping request where profile data 751 of the users 750 indicate such users patronize one or more business locations 732.

Topical criteria can be used to select enhanced content for entities that relate to a topic. For example, context enhanced mapping request could include criteria to select restaurants 732 that specialize in a specific cuisine, such as sushi. Such information can be available to the network through information 734 associated with commercial locations within the scope of the mapping request where a topical IO 732 indicates a business relates to the topic of the request.

A context enhanced mapping request can additionally include criteria that explicitly state the point of view of the mapping request. The mapping request can specify that enhanced content should be retrieved from the point of view of a group of persons known to the network. For example, a user 710 could enter a request context enhanced mapping request for businesses 732 or points of interest 724 which are related to person known to the network 760 through one or more topical IOs or whose profile data 761 indicate the businesses 732 are favored by one or more users 760.

Criteria specifying a group of users could select all persons known to the network 760 or select a subset of such persons. Such a subset could be selected with criteria related to any available profile data 761 or topical associations 763. Criteria related to profile data could include demographic data, such as age, gender, nationality and so forth, as well as criteria related to Network activity, such as early adopters, heavy users and so forth. Criteria related to topical interests could include user hobbies, music preferences, food preferences and so forth. Criteria specifying a group of users could explicitly or implicitly include or exclude the requesting user.

Referring back to previously cited examples, suppose, a user wishes to display a map enhanced with content for a 14 year-old girl who has soccer for a hobby who is having an all-girl birthday party in the city. The request could include criteria specifying a city, females aged 14, birthday parties, soccer, and so forth. Such a request could select users known to the network 760 who are female, aged 14, and select restaurants 732 favored by such persons. Locations 732 within the city having information 734 that indicate they relate to soccer or specialize in hosting birthday parties could be favored. Enhanced content could then be retrieved for a subset of locations best fitting the criteria of the mapping request. Such enhanced content could then be displayed on a map displayed on, for example, a user's mobile phone, gaming device or PDA.

In another example, suppose a user may wish to display a map enhanced with content for a visiting physics professor from Japan who is in his 50s who likes jazz and physics. The request could include criteria specifying a city, males aged 50 to 60, Japanese, jazz, and physics. Such a request could select users known to the network 760 who are Japanese, aged 50-60, and select business 732 favored by such persons. Locations 732 within the city having information 734 that indicate they relate to jazz or physics could be favored. Enhanced content could then be retrieved for a subset of locations best fitting the criteria of the mapping request. Such enhanced content could then be displayed on a map displayed on, for example, a user's mobile phone, gaming device or PDA.

In another example, suppose a user may wish to display a map enhanced with content for a set of conference attendees, which include the requesting user. The request could include criteria specifying a conference, a 70 mile radius, the requesting user and users attending the conference. Such a request could select users known to the network 760 whose profile 761 or whose topical associations 763 indicate are attending the conference, and would further select the requesting user 710. Locations 732 within a 70 mile radius of the conference having topical associations 712 or 763 indicating the location relates to interests of one or more attendees may be selected. Locations that are frequented by or favorably reviewed by the requesting user 710 may be favored. Enhanced content could then be retrieved for a subset of locations best fitting the criteria of the mapping request. Such enhanced content could then be displayed on a map displayed on, for example, a user's mobile phone, gaming device or computer.

Figure 10:
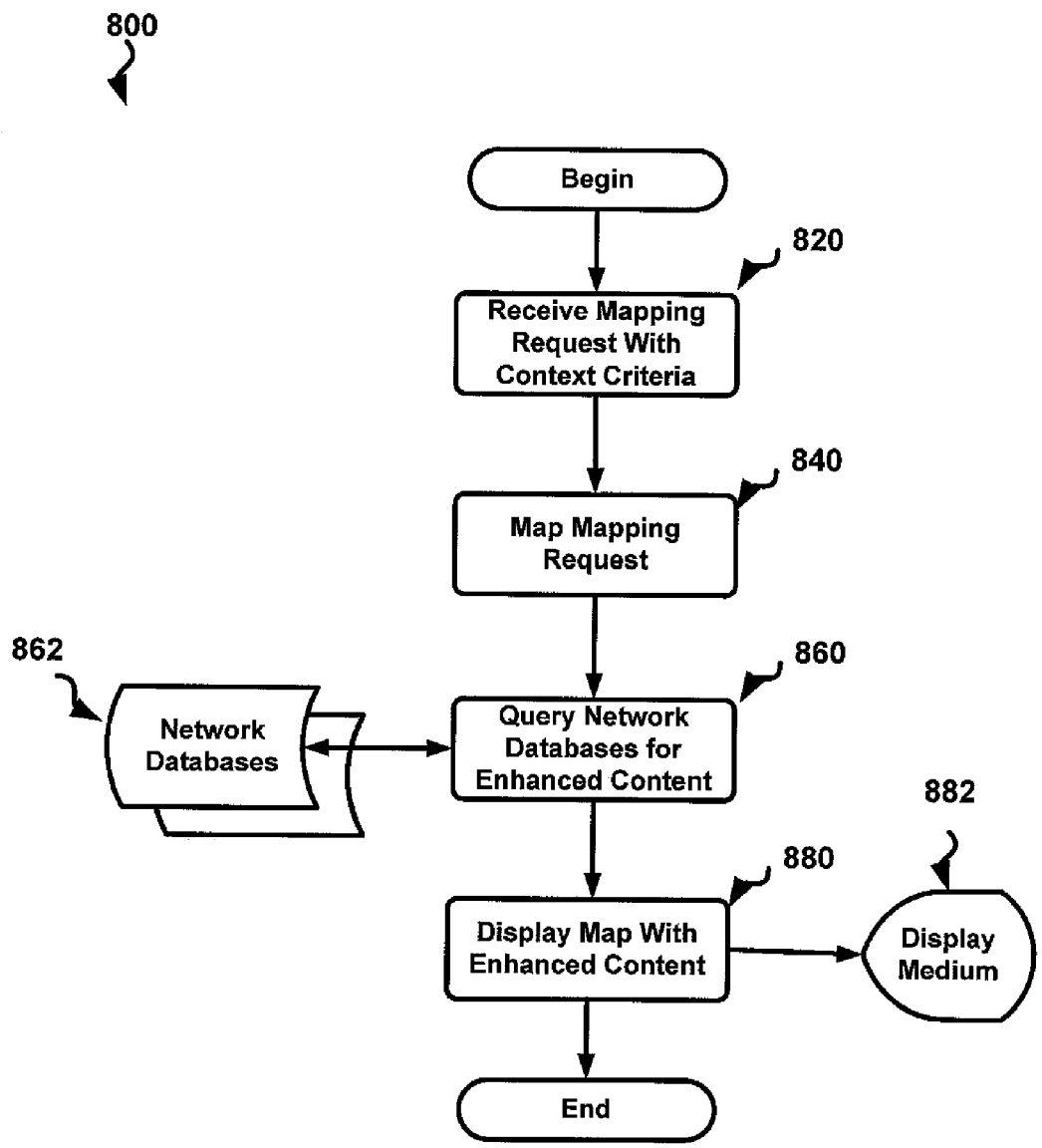
FIG. 10 illustrates one embodiment of a process 800 of how a network containing temporal, spatial, and social network and topical data for a plurality of users, devices, and locations (such as a W4 COMN), can be used to enable the display of maps having enhanced content related to complex user contexts having who, where, when, and what criteria.

FIG. 10 illustrates one embodiment of a process 800 of how a network containing temporal, spatial, and social network and topical data for a plurality of users, devices, and locations (such as a W4 COMN), can be used to enable the display of maps having enhanced content related to complex user contexts having who, where, when, and what criteria.

The process begins when a user enters a mapping request having context criteria 820 using a user proxy device such as, for example, a portable media player, mobile phone, gaming device, PDA, or computer. The map request includes express (e.g. an address or a city) or implied (e.g. an event location) spatial criteria that specify what physical location is to be displayed on a map. Spatial criteria can include a level of resolution of the map. Spatial criteria can also include a routing request or itinerary suggestion request.

Context criteria can additionally include any combination of spatial, temporal, social or topical criteria. In one embodiment, the criteria can be related to one another using standard relational or set operators. In one embodiment, the query can be stated as a natural language query. In one embodiment, context criteria can be ranked in relative importance for each request and prioritized appropriately in the resulting population of enhanced content. The request can be regarded as containing, by default, a context which specifies the requesting user (i.e. the request is taken from the point of view of the requesting user.)

A map, which may include one or more routes, is mapped 840 by a mapping application. The context criteria is used to formulate a query based on the context criteria so as to search 860, via the network, for user profile data, social network data, spatial data, temporal data and topical data that is available via the network 842 and relates to the context as to identify enhanced content relevant to the context criteria. In one embodiment, such data is retrieved via a global index maintained by the network and included within the data available to the network 862. The map mapped in step 840 is then displayed 880 on a display medium 882 including the enhanced content retrieved in step 860.

Figure 11:
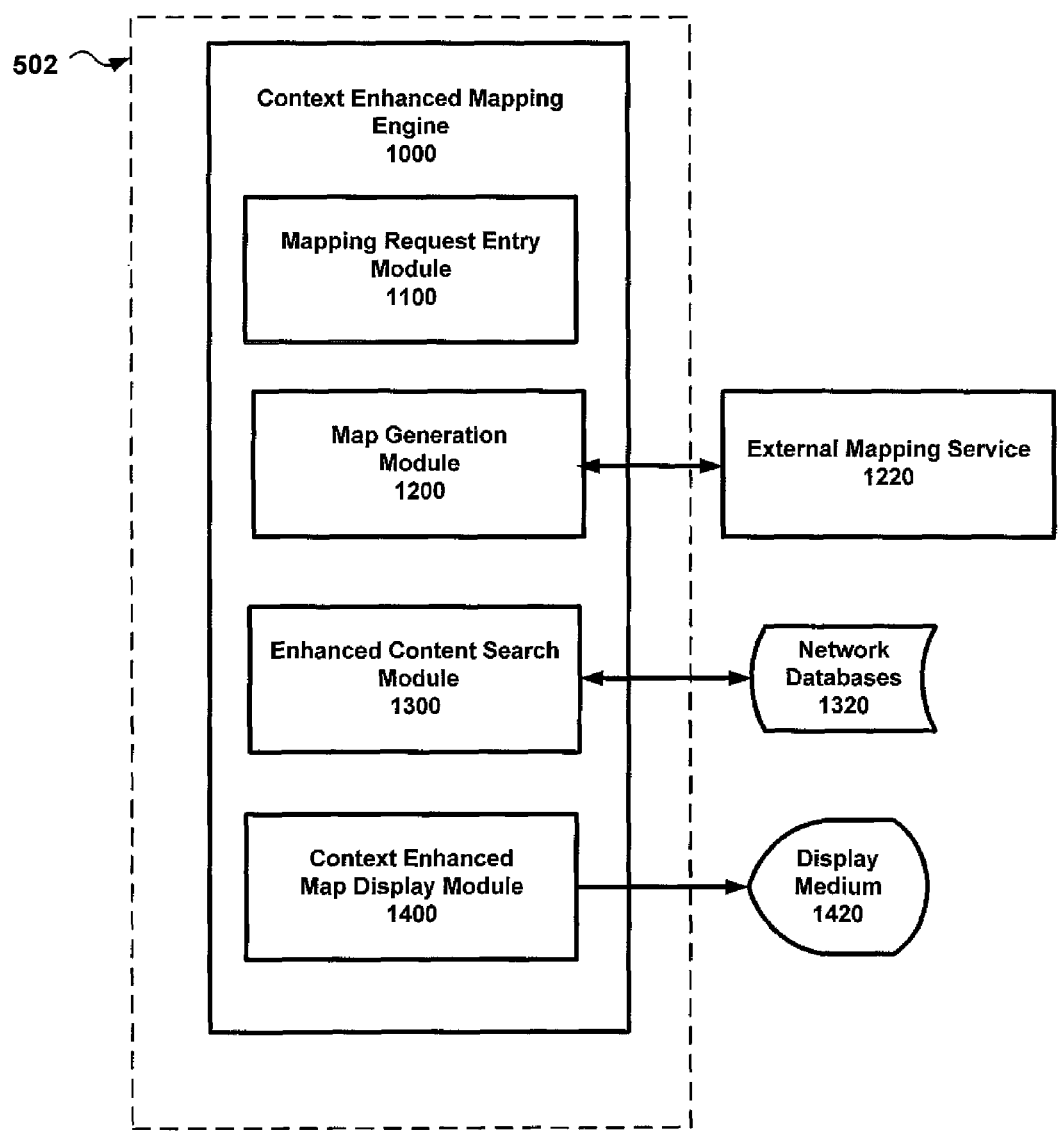
FIG. 11 illustrates the components of one embodiment of a context enhanced mapping engine.

FIG. 11 illustrates the components of one embodiment of a context enhanced mapping engine 1000. In one embodiment, the context query engine is a component of a W4 engine 502 within a W4 COMN. In alternative embodiments, the context query engine 1000 is a standalone application that has access to one or more databases containing temporal, spatial, social network and topical data relating to one or more users.

The context enhanced mapping engine 1000 includes: a mapping request entry module 1100 that provides a user interface for entry of context enhanced mapping requests; a map generation module 1200 that generates maps related to spatial criteria contained in context enhanced mapping requests; an enhanced content search module 1300 that searches network databases 1320 for enhanced content related to context criteria; and context enhanced map display module 1400 that displays maps mapped by map generation module 1200 enhanced with content retrieved by the enhanced content search module 1300 on a display medium 1420. Any of the aforementioned modules or the communications between modules (e.g. the playlist or the query) may be stored on computer readable media, for transient, temporary or permanent stage.

The interface provided by the mapping request entry module 1100 may be a graphical user interface displayable on mobile phones, gaming devices, computers or PDAs, including HTTP documents accessible over the Internet. Such an interfaces may also take other forms, including text files, such as SMS, emails, and APIs usable by software applications located on computing devices. The interface provides for entry of mapping or routing requests context critera that include spatial, temporal, social, or topical criteria.

In one embodiment, the criteria can be related to one another using standard relational or set operators. In one embodiment, temporal and spatial data obtained from sensors within user devices can be included in the context criteria. For example, the current location of a device associated with a user can be automatically identified and included in the context. The user creating the context can be automatically identified through the association of the proxy device with a user within the network and automatically included in the context.

The map generation module 1200 can generate maps or maps including routes using any conventional mapping or routing techniques known in the art. In one embodiment, the map generation module 1200 may use the services of a external mapping or routing application, such Yahoo! Maps.

The enhanced content search module 1300 searches one or more network databases 1320, for user profile data, social network data, spatial data, temporal data and topical data that is available via the network and relates to the map and context criteria so as to identify enhanced content that is relevant to the map and the context criteria. Such searches are performed using the capabilities of the network databases 1320 and their supporting infrastructure.

The enhanced content search module 1300, without limitation, parse query terms, identify entities and attributes of entities within the query and further identify relationships between entities and their attributes, as well as relationships to fixed data, such as times, places, and events. Entities and attributes within the query can then be cross referenced against the network databases for correspondence to entities, objects, and attributes within the network database.

In one embodiment, the network databases 1320 can include sponsored content that businesses pay to be displayed on content enhanced maps. Such sponsored content may be targeted to a specific class of users, or alternatively, be displayed on every map which displays a specific geographic area.

In one embodiment, the criteria are interpreted to take advantage of the best available data within the network. For example, if data relevant to the context resides on a relational database, the query module can execute a series of SQL statements for retrieving data from a relational database or a procedural language containing embedded SQL. Queries may be nested or otherwise constructed to retrieve data from one set of entities, and to use the result set to drive additional queries against other entities, or to use recursive data retrieval.

In the case of a W4 COMN, the context enhanced mapping request can be stored as an IO. Such an IO may itself be comprised of a cluster of linked IOs relating to topics, each IO relating to one or more context criteria. In one embodiment, the query module is a component of a correlation engine of a W4 engine. An IO relating to a context request can be mapped and represented against all other known entities and data objects in order to create both a micro graph for every entity as well as a global graph that relates all known entities with one another, and media objects relevant to the context are thereby identified. In one embodiment, such relationships between entities and data objects are stored in a global index within the W4 COMN.

In one embodiment, the context enhanced map display module 1400 displays maps with enhanced content on a user interface. The interface can be a graphical user interface displayable on computers, mobile phones, gaming devices or PDAs, including HTTP documents accessible over the Internet. Such an interface may also take other forms, including text files, such as SMS, emails, and APIs usable by software applications located on computing devices. In one embodiment, enhanced content can be displayed as an overlay of a graphical display of a map to which the content relates.

Figure 12:
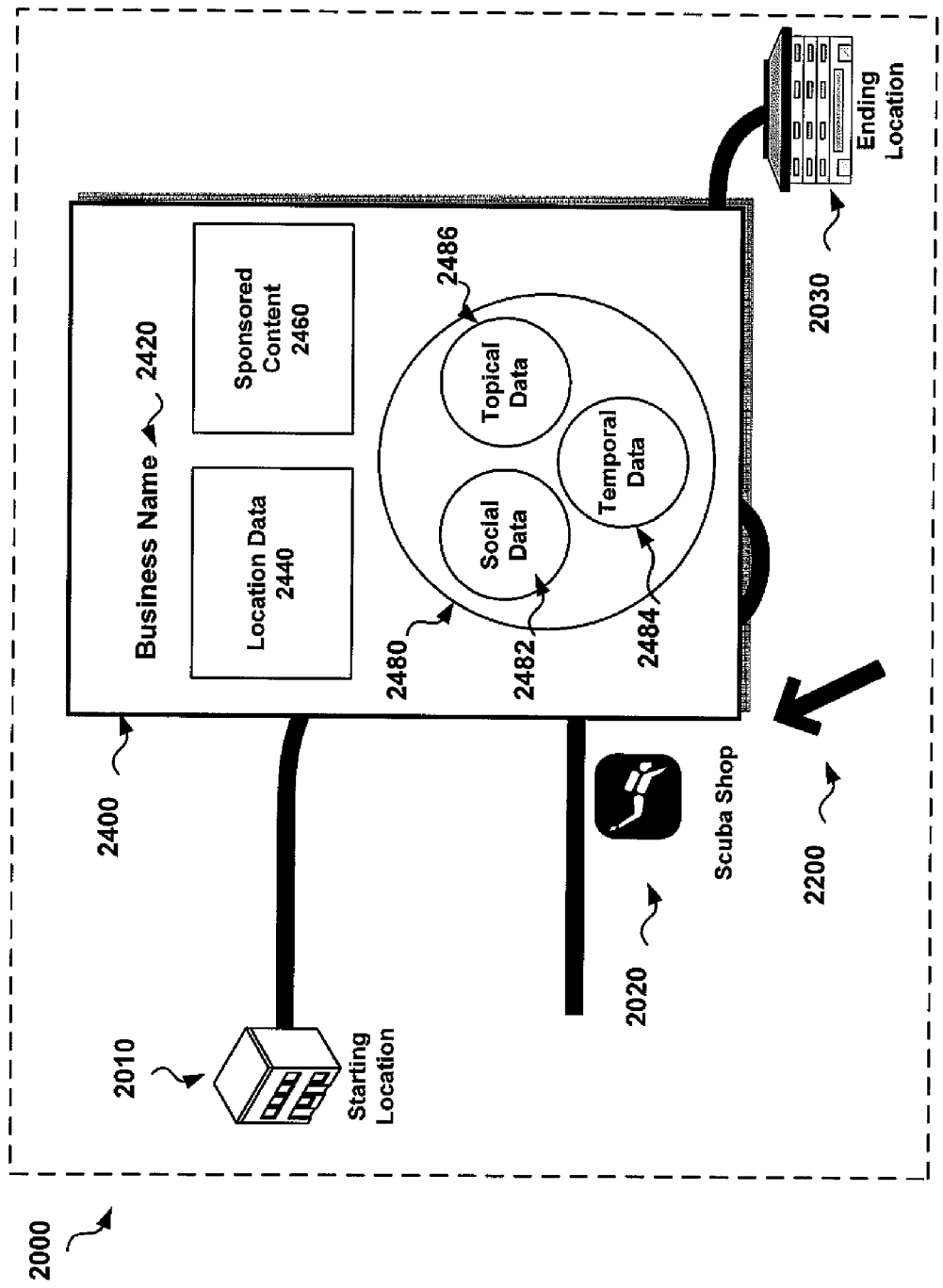
FIG. 12 illustrates how a maps with enhanced content can be displayed on a display device.
Figure 13:
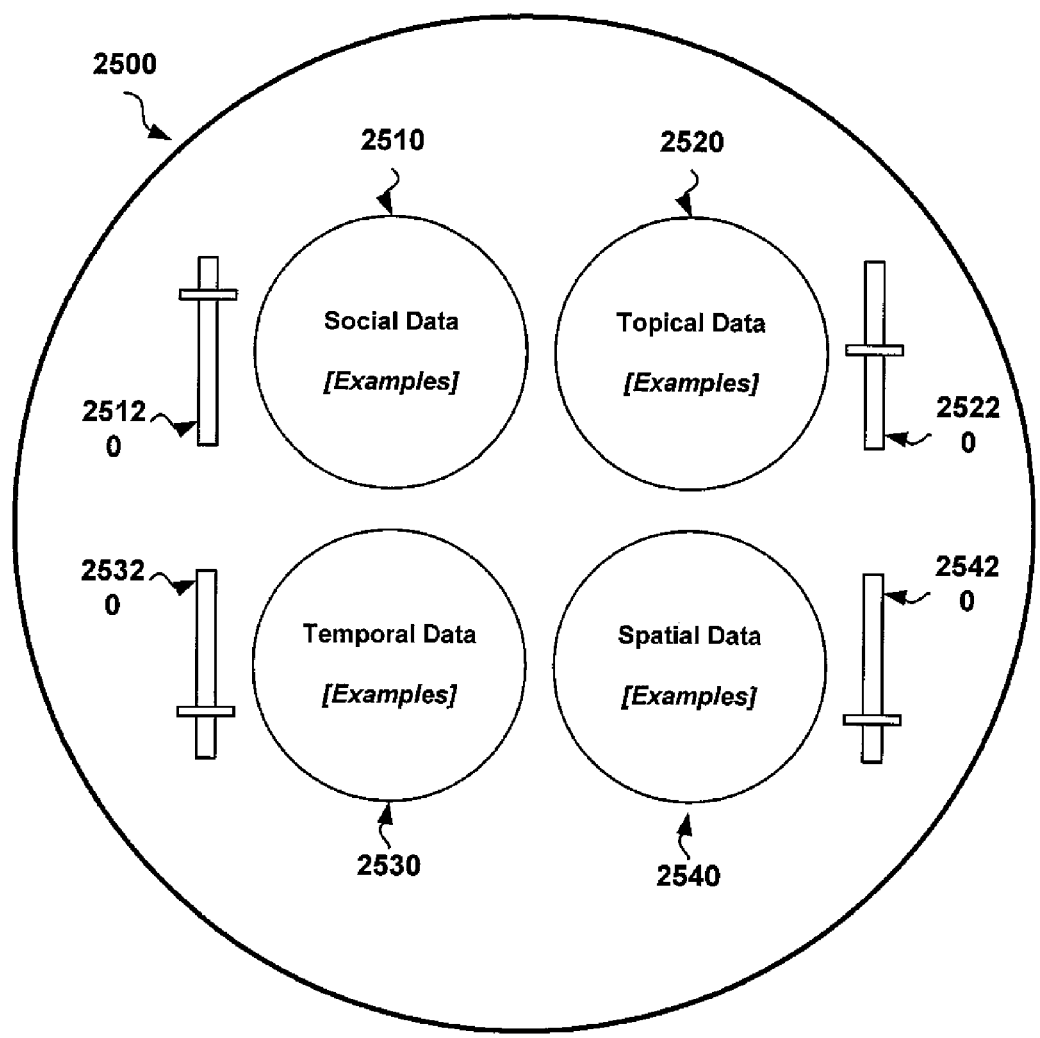
FIG. 13 illustrates one embodiment of a popup in interface element displayed when a user passes a mouse cursor over an symbol representing a business which is displayed on a content enhanced map.

For example, maps with enhanced content can be displayed on a map in a where initially, a single symbol is displayed indicating a business entities for which there is sponsored or recommended content. In one such embodiment, further information can be displayed in a popup window regarding the selected content when a mouse cursor is moved over the symbol. FIG. 12 illustrates one possible embodiment of such an interface. A map 2000 is displayed which shows symbols for starting location 2010, an ending location 2020, and a business, a scuba shop 2030. When a mouse cursor 2200 is moved near or over the symbol for the scuba shop 2030, a popup window 2400 is displayed.

The popup window contains the business name 2420 and data regarding the location 2440, such as address, telephone number, hours of operation, and products and services offered. If sponsored content, such as a targeted advertisement, is available for the location, it is displayed in a separate area 2460 on the popup window. The popup window can also display data 2480 which reveals temporal 2484, social 2482, and topical 2486 relationships between the content and the requesting user or the map request.

In one embodiment, the context enhanced map display module 1400 can allow the requesting user can modify one or more parameters of displayed map to further customize it once initially displayed, by for example, increasing or decreasing the weighting or value of any spatial, social, temporal or topical data, data type or source. The interface 2000 can be used to apply differential weights to spatial 2400, temporal 2300, social 2100, and topical factors 2200 using sliders 2420, 2320, 2120, and 2220.

Interactive Mapping and Map Sharing and Marketing

A context enhanced map can be augmented by allowing users to edit and annotate maps after they are displayed, save those maps for future use or sharing with the public or a limited group of users.

Figure 14:
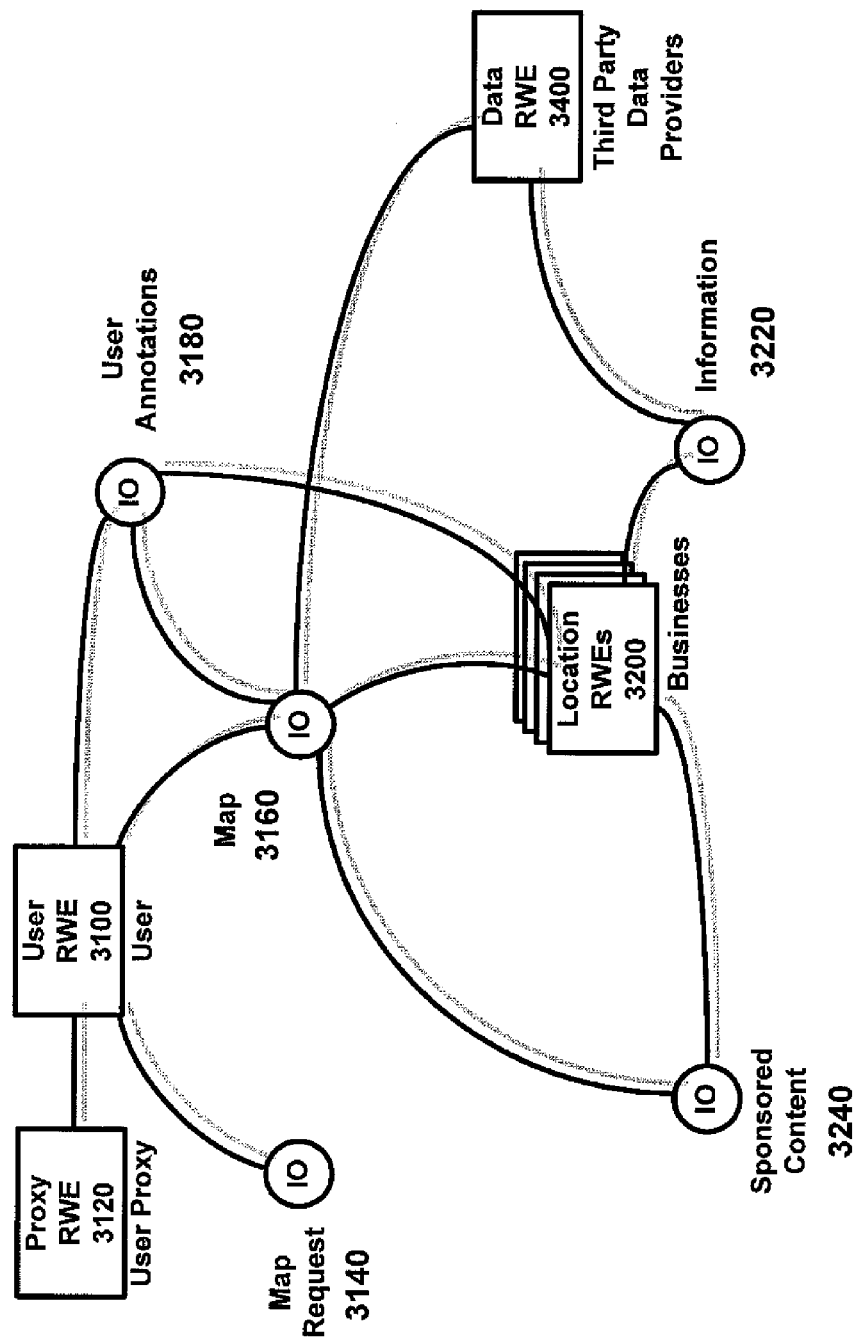
FIG. 14 illustrates one embodiment of a data model associated with a map generated by a context enhanced map request where a user is able to edit and annotate the content of a map generated in response to a context enhanced map request.

FIG. 14 illustrates one embodiment of a data model 3000 associated with a map generated by a context enhanced map request 3140 where a user is able to edit and annotate the content of a map 3160 generated in response to a context enhanced map request 3140.

The requesting user 3100 has previously entered a context enhanced map request 3140, and in response, has received a map 3160 reflecting information for one or more locations 3200 within the scope of the mapping request. Such content may include information 3220 related to the locations 3220, which may include information from third party providers 3400. Such content may also include sponsored content 3260. The system may provide an interface that allows the requesting user 3100 to annotate 3180 the map 3160 or in one embodiment add or delete locations 3200 displayed on the map.

Annotations 3180 can relate to the map or route as a whole. For example, a user may enter comments about the terrain surrounding the route or anecdotes about the trip that do not relate to specific locations, or a user may label the entire route as appropriate for a specific purpose, e.g. a great road for test-driving a sports car or the perfect romantic date. Annotations 3180 can also relate to specific locations 3200 on the map the user passed or visited, For example, the user could provide annotations reviewing restaurants or hotels the user visited along the route including rating the venue or location for a specific purpose, e.g. great for large parties, or ranking the venue or location, e.g. my favorite hotel, my least favorite restaurant.

The map IO 3160 and its annotations 3180 may be retained indefinitely. Furthermore, the map 3160 and its annotations may be of interest to other users. For example, a user may map an automobile trip proceeding from Savannah, Ga. to Key West, Fla., and specify Bed and Breakfast lodging and local restaurants featuring regional cuisine. During the course of the trip, the user may insert comments or reviews of lodging or restaurants, or even of road conditions or speed traps, the user encountered during the trip, and these annotations can be searched and used by other users in the future who plan the same or similar routes.

The map IO 3160 and its annotations 3180 can be shared on a network, for example, a W4 COMN, and be available for other users to enter additional comments about locations encountered along a route. The map IO 3160 and its annotations 3180 can be freely shared on a network and provide a resource for network users who plan on making a similar itinerary. Alternatively, a user could choose to charge other users a fee to view the map and its annotations, and the Network then presents such annotated maps with the terms of use to new users and any users, tracks acceptances and debits the consuming user and credits the publishing user, third-party or Network affiliate.

Creation of persistent maps additionally creates marketing opportunities for businesses. A business may create a map or trip IO 3160 reflecting, for example, travel tips and recommendations for a route driving down the coast from New York Cirt to Hilton Head, S.C. The map could feature hotels along the route from a specific hotelier such as Hilton or Marriott. The locations on the route 3200 could, individually be associate with sponsored content 3240, such as advertisements for specific locations. Alternatively, the map itself could be associated with sponsored content 3240.

Where a map IO 3160 references content, directly or indirectly, from third party data sources which require a subscription or which otherwise charge a fee for accessing such content, the map IO 3160 may be viewable by any user, but may require a subscription or a fee for viewing fee based content.

In one embodiment, when a user enters a context enhanced mapping request 3140, the network may match the request against preexisting maps 3160 that have been retained by the system and offer the user an opportunity to view maps that have been developed by other users or commercial entities such as businesses.

Users who create shared maps 3160 may additionally be compensated by businesses 3200 for recommending the services of the businesses within the map when other users access such maps or display sponsored content associated with the business Such compensation can be monetary or non-monetary. Examples of non-monetary compensation can include certification, association, recommendation, linking, as well as network reputation scores or credits of some form exchangeable for other products or services, e.g. loyalty points or airline miles.

Figure 15:
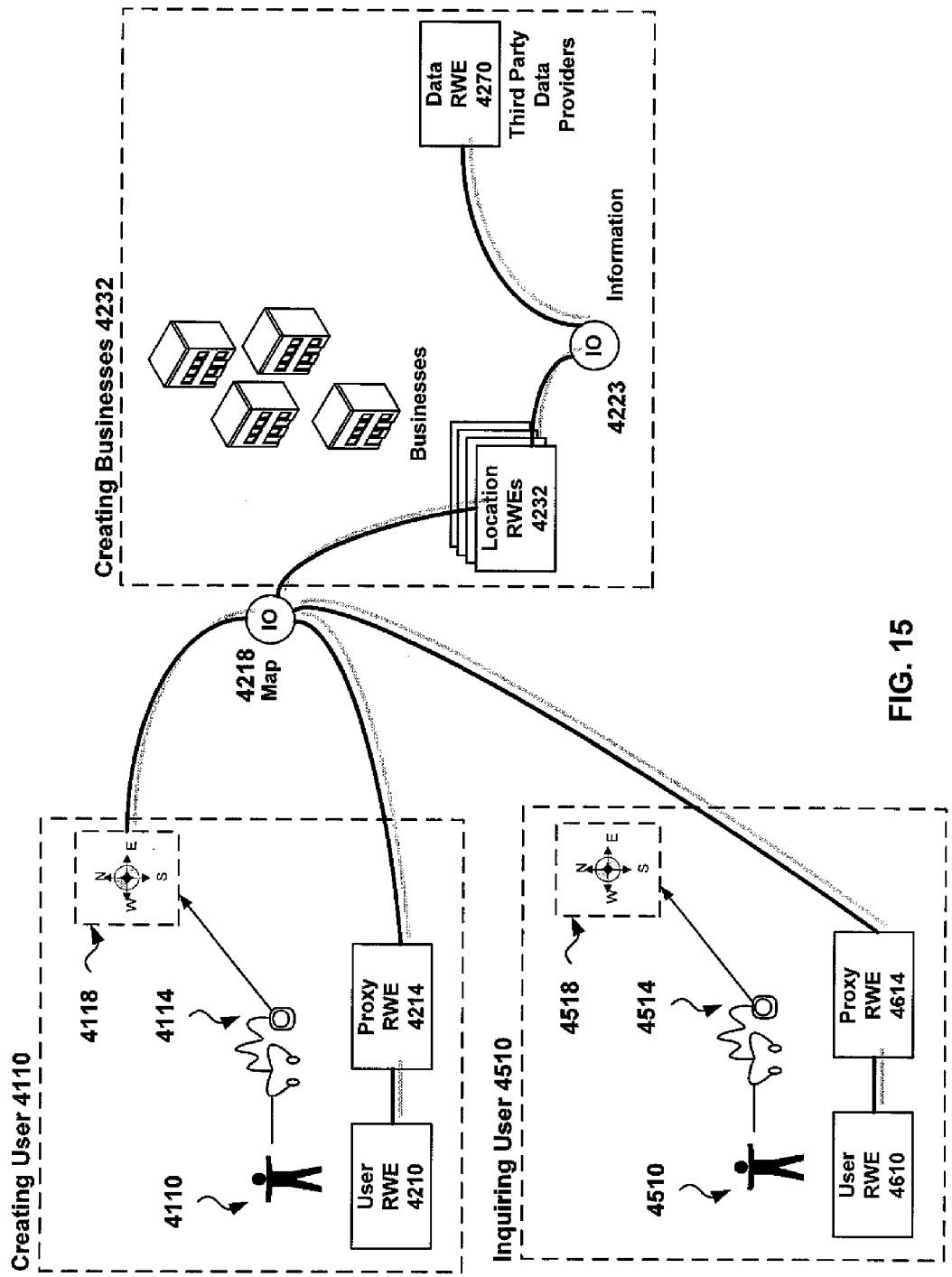
FIG. 15 illustrates a conceptual embodiment of a system that allows users and businesses to share maps with enhanced content.

FIG. 15 illustrates a conceptual embodiment of a system 4000 that allows users and businesses to share maps with enhanced content. A user 4210 RWE can enter a context based mapping request through a proxy device 4214 that creates a map 4218 displayed on the user proxy device 4118. The user 4210 can further customize the map 4218 with annotations. The map is represented within the network, for example, a W4 COMN, as a map IO 4218 which contains all data relating to the map. The user 4210 can elect to store the map IO on the network for future access by the user 4210, or by other users.

Alternatively, or additionally, businesses 4232 RWEs can enter a context based mapping request for a map 4218 that is displayable on user proxy devices 4118. The map is represented within the network, for example, a W4 COMN, as a map IO 4218 which contains all data relating to the map. The businesses RWEs 4232 can customize the map 4218 with annotations and can further associate the map with content from third party data providers 4270. The businesses 4210 can elect to store the map IO on the network for future access by the user RWEs 4210, 4610 or by other users.

An inquiring user RWE 4610 can enter a context enhanced map request using a proxy device 4514. Such a request can be processed and may match one or more stored maps 4218 which can be displayed on the user's proxy device 4514. The inquiring user RWE 4610 can select a map 4218 to have access to the customized content available through the map.

Figure 16:
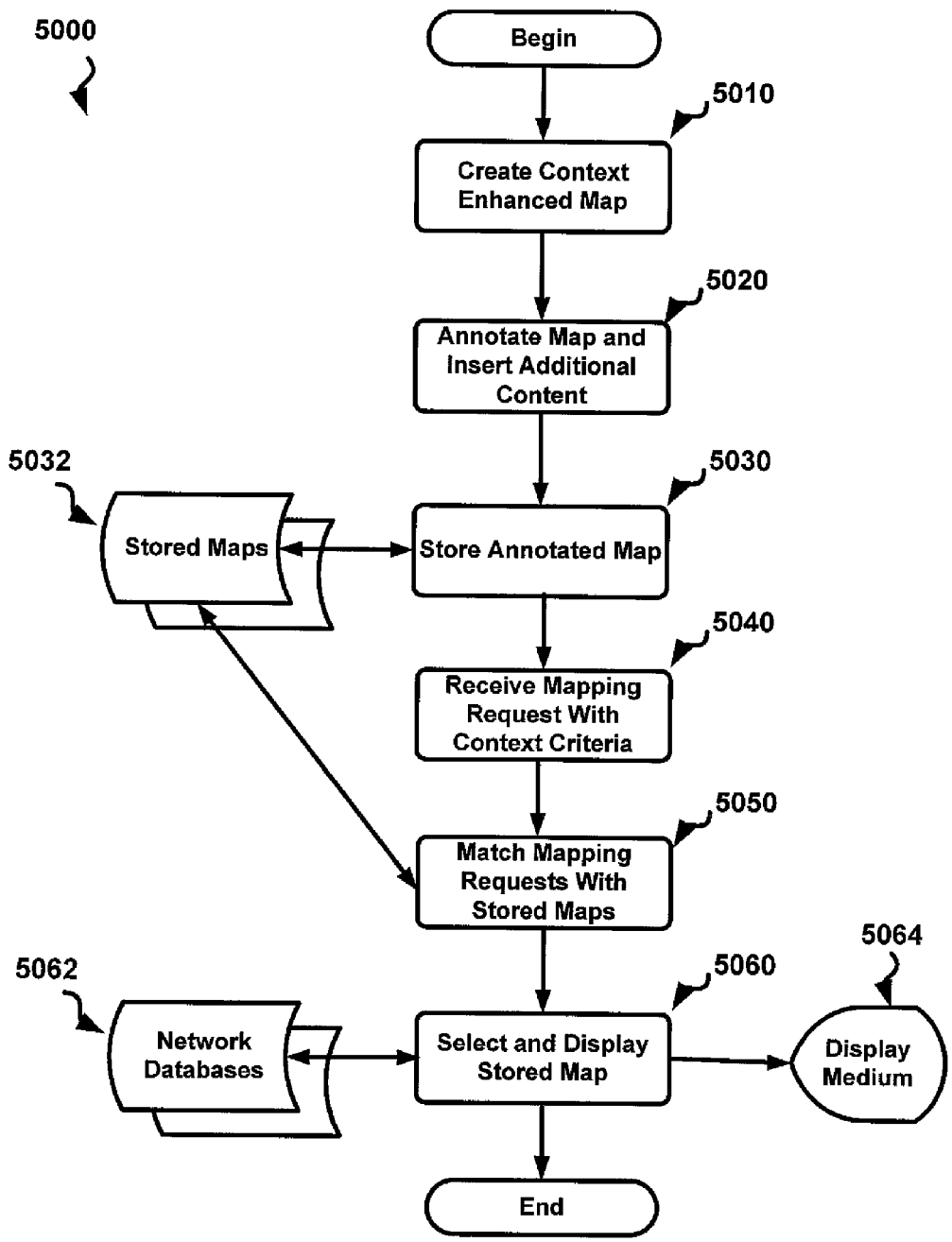
FIG. 16 illustrates one embodiment of a process of how context enhanced maps can be created and stored on a network containing temporal, spatial, and social network and topical data for a plurality of users, devices, and locations (such as a W4 COMN)

FIG. 16 illustrates one embodiment of a process 5000 of how context enhanced maps can be created and stored on a network containing temporal, spatial, and social network and topical data for a plurality of users, devices, and locations (such as a W4 COMN.

The process begins when a user or a business creates a context enhanced map 5010 using, for example, a process such as that illustrated in FIG. 10. The map is then annotated and additional content, included paid or sponsored content is inserted into the map 5020. The annotated map is then stored 5030 on the network 5032 for access by other users. When users enter context enhanced mapping requests 5040, the system attempts to match 5050 the request to stored maps 5032. A stored map that matches the context enhanced mapping requests is then selected 5060, populated with data 5062 relating to the stored map 5032 and displayed on a display medium.

Figure 17:
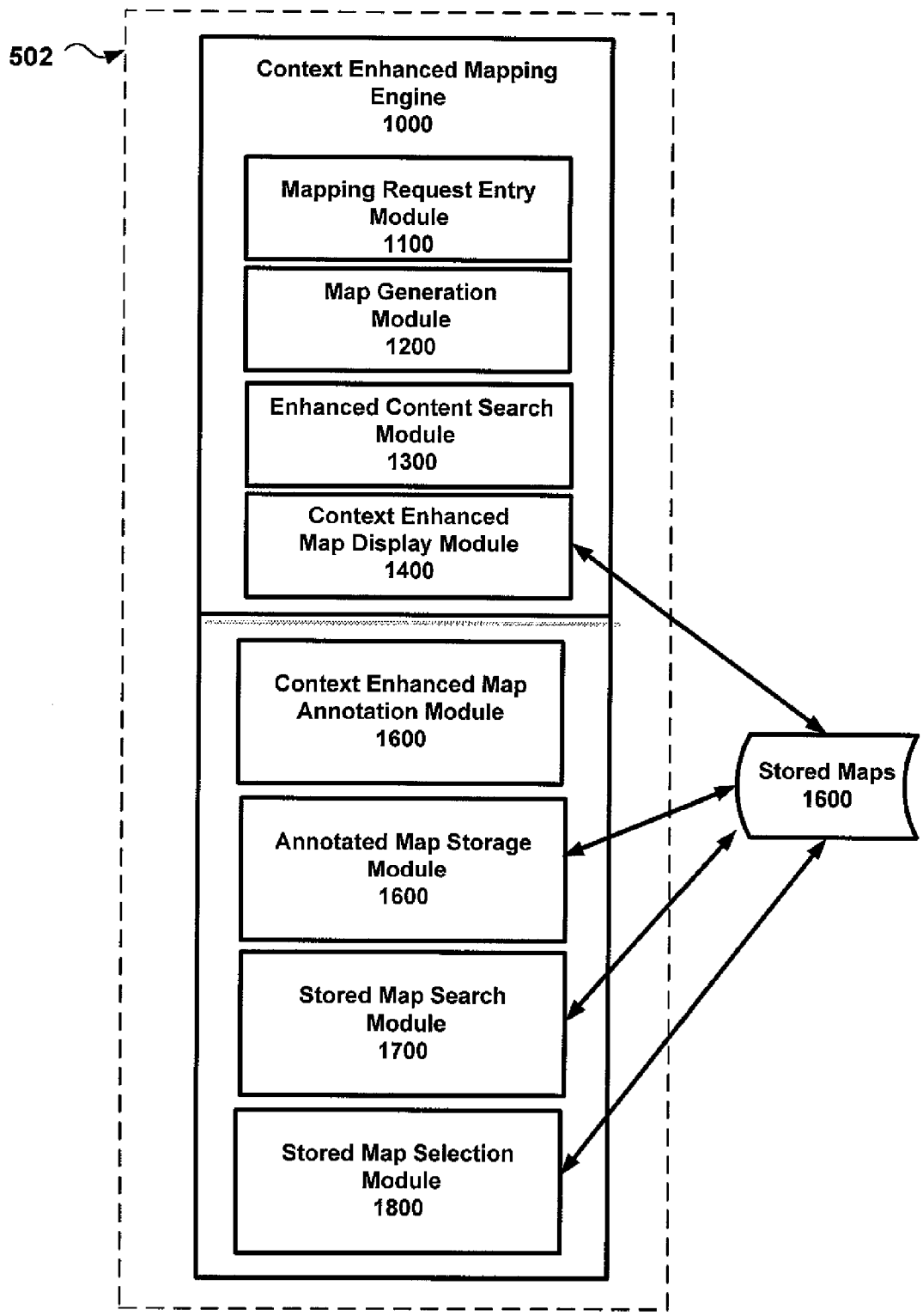
FIG. 17 illustrates how the embodiment of a context enhanced mapping engine shown in FIG. 11 can be extended to support the process illustrated in FIG. 16.

FIG. 17 illustrates how the embodiment of a context enhanced mapping engine 1000 shown in FIG. 11 can be extended to support the process illustrated in FIG. 16. In one embodiment, the context query engine is a component of a W4 engine 502 within a W4 COMN. In alternative embodiments, the context query engine 1000 is a standalone application that has access to one or more databases containing temporal, spatial, social network and topical data relating to one or more users.

The mapping request entry module 1100, the map generation module 1200, the enhanced content search module 1300 and the context enhanced map display module 1400 all provide the functionality described with respect to FIG. 10 above, but are supplemented by additional modules and provide additional functionality.

A context enhanced map annotation module 1500 allows a user or other entity to annotate context enhanced maps and insert additional content, which may include paid or sponsored content. The module may provide a user interface for entry of annotations. In one embodiment, the user interface is implemented as part of the map display provided by the context enhanced map display module 1400.

An annotated map storage module 1600 allows a user or other entity to store annotated content enhanced maps 1620 on the network. A stored map search module 1700 uses context enhanced mapping requests to search for stored maps that satisfy the criteria of context enhanced mapping requests. A stored map selection module 1800 allows a user to select a stored map for display by the context enhanced map display module 1400. The stored map selection module 1800 may provide a user interface for selection of stored maps. In one embodiment, the user interface is implemented as part of the map display provided by the context enhanced map display module 1400.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving, over a network at a computing device, a request for a map from a first user, said request comprising an identification of a physical location and at least one criteria;
   searching, via the computing device, data storage available to the network, the storage storing maps that comprise additional data added by a second user, said additional data added by said second user comprising social criteria, topical criteria, spatial criteria and temporal criteria associated with said second user, and an identification of said second user;
   identifying, via the computing device, using results of the search, a set of maps stored on the network that correspond to the physical location and the at least one criteria;
   communicating, via the computing device over the network, information associated with each map of said set of maps to said first user;
   receiving from said first user, at the computing device, a selection of an identified map of said set of maps; and
   communicating, over the network, the selected map to said first user for display on a device associated with the first user.

2. The method of claim 1, wherein said at least one criteria comprises social criteria, topical criteria, spatial criteria and temporal criteria associated with said first user.

3. The method of claim 2, wherein said at least one criteria further comprises contextual criteria comprising an identification of said first user.

4. The method of claim 1, wherein said at least one criteria comprises social criteria, topical criteria, spatial criteria and temporal criteria associated with a group of users.

5. The method of claim 1, wherein said at least one criteria is associated with sponsored content.

6. The method of claim 1, further comprising;
   storing said identification of the physical location and said at least one criteria in association with said selected at least one map.

7. The method of claim 1, further comprising:
   receiving, from said first user, user specified data associated with said physical location, said user specified data comprising annotations corresponding to said physical location; and
   storing said user specified data in association with said selected at least one map.

8. The method of claim 7, wherein said user specified data comprises sponsored content.

9. The method of claim 1, wherein said information associated with each map comprises a map portion.

10. The method of claim 1, wherein said information associated with each map comprises said additional data.

11. A non-transitory computer-readable storage medium tangibly encoded with computer-executable instructions, that when executed by a computing device, performs a method comprising:
    receiving, over a network, a request for a map from a first user, said request comprising an identification of a physical location and at least one criteria;
    searching data storage available to the network, the storage storing maps that comprise additional data added by a second user, said additional data added by said second user comprising social criteria, topical criteria, spatial criteria and temporal criteria associated with said second user, and an identification of said second user;

identifying, using results of the search, a set of maps stored on the network that correspond to the physical location and the at least one criteria;

communicating, over the network, information associated with each map of said set of maps to said first user;

receiving from said first user a selection of an identified map of said set of maps; and communicating, over the network, the selected map to said first user for display on a device associated with the first user.

12. The non-transitory computer-readable storage medium of claim 11, wherein said at least one criteria comprises social criteria, topical criteria, spatial criteria and temporal criteria associated with said first user, said at least one criteria further comprises contextual criteria comprising an identification of said first user.

13. The non-transitory computer-readable storage medium of claim 11, further comprising;

storing said identification of the physical location and said at least one criteria in association with said selected at least one map.

14. The non-transitory computer-readable storage medium of claim 11, further comprising:

receiving, from said first user, user specified data associated with said physical location, said user specified data comprising annotations corresponding to said physical location; and storing said user specified data in association with said selected at least one map.

15. The non-transitory computer-readable storage medium of claim 11, wherein said information associated with each map comprises a map portion.

16. The non-transitory computer-readable storage medium of claim 1, wherein said information associated with each map comprises said additional data.

17. A computing device comprising:

a processor;

a non-transitory computer-readable storage medium for tangibly storing thereon program logic for execution by the processor, the program logic comprising:

receiving logic executed by the processor for receiving, over a network, a request for a map from a first user, said request comprising an identification of a physical location and at least one criteria;

searching logic executed by the processor for searching data storage available to the network, the storage storing maps that comprise additional data added by a second user, said additional data added by said second user comprising social criteria, topical criteria, spatial criteria and temporal criteria associated with said second user, and an identification of said second user;

identification logic executed by the processor for identifying, using results of the search, a set of maps stored on the network that correspond to the physical location and the at least one criteria;

communication logic executed by the processor for communicating, over the network, information associated with each map of said set of maps to said first user;

receiving logic executed by the processor for receiving from said first user a selection of an identified map of said set of maps; and communication logic executed by the processor for communicating, over the network, the selected map to said first user for display on a device associated with the first user.

18. The computing device of claim 17, further comprising:

receiving logic executed by the processor for receiving, from said first user, user specified data associated with said physical location, said user specified data comprising annotations corresponding to said physical location; and storage logic executed by the processor for storing said user specified data in association with said selected at least one map.

* * * * *